United States Patent
Azagarsamy et al.

(10) Patent No.: US 11,127,976 B2
(45) Date of Patent: Sep. 21, 2021

(54) SULFUR-BASED POLYESTER ELECTROLYTES FOR HIGH VOLTAGE LITHIUM ION BATTERIES

(71) Applicants: Seeo, Inc., Hayward, CA (US); Robert Bosch GmbH, Stuttgart (DE)

(72) Inventors: Malar Azagarsamy, Fremont, CA (US); Kulandaivelu Sivanandan, Fremont, CA (US); Hany Basam Eitouni, Oakland, CA (US); Jonathan P. Mailoa, Cambridge, MA (US); Georgy Samsonidze, Boston, MA (US); Boris Kozinsky, Waban, MA (US); Mordechai Kornbluth, Brighton, MA (US)

(73) Assignee: Robert Bosch GmbH, Stuttgart (DE)

( * ) Notice: Subject to any disclaimer, the term of this patent is extended or adjusted under 35 U.S.C. 154(b) by 256 days.

(21) Appl. No.: 16/286,549

(22) Filed: Feb. 26, 2019

(65) Prior Publication Data
US 2020/0274196 A1 Aug. 27, 2020

(51) Int. Cl.
| | |
|---|---|
| *H01M 10/0565* | (2010.01) |
| *C08G 75/26* | (2006.01) |
| *H01M 4/36* | (2006.01) |
| *H01M 10/0525* | (2010.01) |
| *C08G 75/00* | (2006.01) |
| *H01M 50/409* | (2021.01) |
| *H01M 4/02* | (2006.01) |

(52) U.S. Cl.
CPC ........ *H01M 10/0565* (2013.01); *C08G 75/00* (2013.01); *C08G 75/26* (2013.01); *H01M 4/364* (2013.01); *H01M 10/0525* (2013.01); *H01M 50/409* (2021.01); *H01M 2004/028* (2013.01); *H01M 2300/0025* (2013.01)

(58) Field of Classification Search
CPC ........ C08G 75/00; C08G 75/24; C08G 75/26; C08G 75/18; C08L 81/00; H01M 2/16; H01M 4/134; H01M 4/364; H01M 4/382; H01M 4/62; H01M 10/0525; H01M 10/056; H01M 10/0565; H01M 2004/028; H01M 2300/0025; H01M 2300/0068; H01M 2300/0082; H01M 2300/0091
See application file for complete search history.

(56) References Cited

U.S. PATENT DOCUMENTS

| | | | |
|---|---|---|---|
| 2,497,135 A * | 2/1950 | Myles | C08G 75/00 558/60 |
| 3,514,487 A | 5/1970 | Anello et al. | |
| 3,554,986 A * | 1/1971 | Garst et al. | C08G 75/00 528/381 |
| 3,562,310 A | 2/1971 | Anello et al. | |
| 2019/0393545 A1 | 2/2019 | Azagarsamy et al. | |
| 2019/0131653 A1 | 5/2019 | Azagarsamy et al. | |
| 2019/0190067 A1 | 6/2019 | Azagarsamy et al. | |

FOREIGN PATENT DOCUMENTS

EP 0627780 A1 5/1994

OTHER PUBLICATIONS

Lee, "Ionic conductivity in the poly(ethylene malonate) / lithium triflate system," Solid State Ionics 138 (2001) 273-276.
Kazmina et al., "Bulletin of the Academy of Sciences of the USSR", Division of Chemical Science, vol. 28, No. 1, Part 1, Jul. 10, 1979, ISSN 0568-5230, 10 pages.
Anello et al., "Fluorinated Dialkyl Mono- and Polysulfates", Specialty Chemicals Division, Allied Chemical Corporation, Morristown, New Jersey, 07960, Jun. 18, 1969, 5 pages.

* cited by examiner

*Primary Examiner* — Anca Eoff
(74) *Attorney, Agent, or Firm* — Brooks Kushman P.C.

(57) ABSTRACT

New sulfur-based polyesters have been synthesized. When these polymers are combined with electrolyte salts, such polymer electrolytes have shown excellent electrochemical oxidation stability in lithium battery cells. Their stability along with their excellent ionic transport properties make them especially suitable as electrolytes in high energy density lithium battery cells.

20 Claims, 3 Drawing Sheets

SULFUR-BASED POLYESTER ELECTROLYTES FOR HIGH VOLTAGE LITHIUM ION BATTERIES

BACKGROUND OF THE INVENTION

Field of the Invention

This invention relates generally to electrolytes for lithium batteries, and, more specifically, to electrolytes that are especially suited for use in cathodes and at high voltages.

More and more lithium battery manufacturers are using next-generation cathode materials such as NCA (lithium nickel cobalt aluminum oxide), NCM (lithium nickel cobalt manganese oxide), and high energy NCM (HE-NCM-magnesium-rich lithium nickel cobalt manganese oxide) in order to exploit their potentially high gravimetric energy densities (as high as 300-500 Wh/kg), their good rate capabilities, and their long-term stability. Cells made with such oxidic cathode materials often operate at higher voltages (e.g., as high as 4.7V) than do cells (e.g., 3.6-3.8V) with olivine cathode materials such as LFP (lithium iron phosphate). Electrolytes that have been stable at the lower voltages of LFP cells may have difficulty operating at the higher voltages, especially in the cathode. Degradation, in the form of oxidation, may lead to capacity fade early in the life of a cell.

Thus, there is a need to develop electrolytes that are especially well-suited to operate in the high voltage conditions of next generation cathode materials.

SUMMARY

In one embodiment of the invention, new polymers are disclosed. The polymers include sulfur-based polyester structures described by:

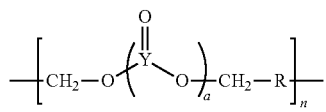

wherein:
Y is selected from the group consisting of sulphur (S) for poly(sulfites) and sulphoxide (S=O) for poly(sulfates);
a and n are integers, wherein a ranges from 2 to 10, and n ranges from 1 to 1000;
R is selected from the group consisting of:

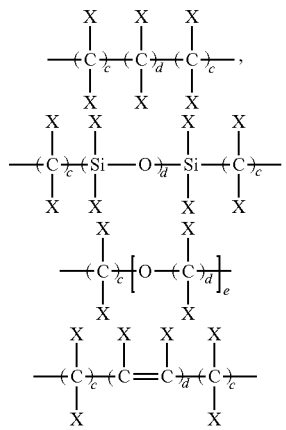

wherein c, d and e are all integers that range independently from 0 to 10; and
X is selected from the group consisting of hydrogen, fluorine, methyl, ethyl, isopropyl, and trifluoromethyl.

In some embodiments of the invention, any of the polymers described herein are combined with an electrolyte salt and can be used as a polymer electrolyte.

In some embodiments of the invention, any of the polymer electrolytes described herein further includes ceramic electrolyte particles.

In some arrangements, any of the polymers described herein is crosslinked. In some arrangements any of the polymers described herein is crosslinked and is combined with an electrolyte salt to be used as a polymer electrolyte.

In one embodiment of the invention, a positive electrode includes a positive electrode active material; and a catholyte comprising any of the electrolytes described herein. The positive electrode active material particles and the catholyte are mixed together. The catholyte may also include a solid polymer electrolyte. The catholyte may also include ceramic electrolyte particles. The catholyte may be crosslinked. The catholyte may contain an electrolyte salt that is a lithium salt.

The positive electrode active material may be any of lithium iron phosphate, lithium metal phosphate, divanadium pentoxide, lithium nickel cobalt aluminum oxide, lithium nickel cobalt manganese oxide, magnesium-rich lithium nickel cobalt manganese oxide, lithium manganese oxide spinel, lithium nickel manganese oxide spinel, and combinations thereof.

In another embodiment of the invention an electrochemical cell includes an anode configured to absorb and release lithium ions; a cathode comprising cathode active material particles, an electronically-conductive additive, and a first catholyte; a current collector adjacent to an outside surface of the cathode; and a separator region between the anode and the cathode, the separator region comprising a separator electrolyte configured to facilitate movement of lithium ions back and forth between the anode and the cathode. The first catholyte may include any of the electrolytes described herein. The first catholyte may also contain ceramic electrolyte particles. The first catholyte may be crosslinked. The electrolyte salt may be a lithium salt.

The first catholyte and/or the separator electrolyte may also contain a solid polymer electrolyte. In one arrangement, the first catholyte and the separator electrolyte are the same.

In one arrangement, there is an overcoat layer between the cathode and the separator region. The overcoat layer includes a second catholyte, which may be any of the electrolytes disclosed herein. The first catholyte and the second catholyte may or may not be the same.

The anode may contain any of lithium metal, lithium alloy, lithium titanate, graphite and silicon.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
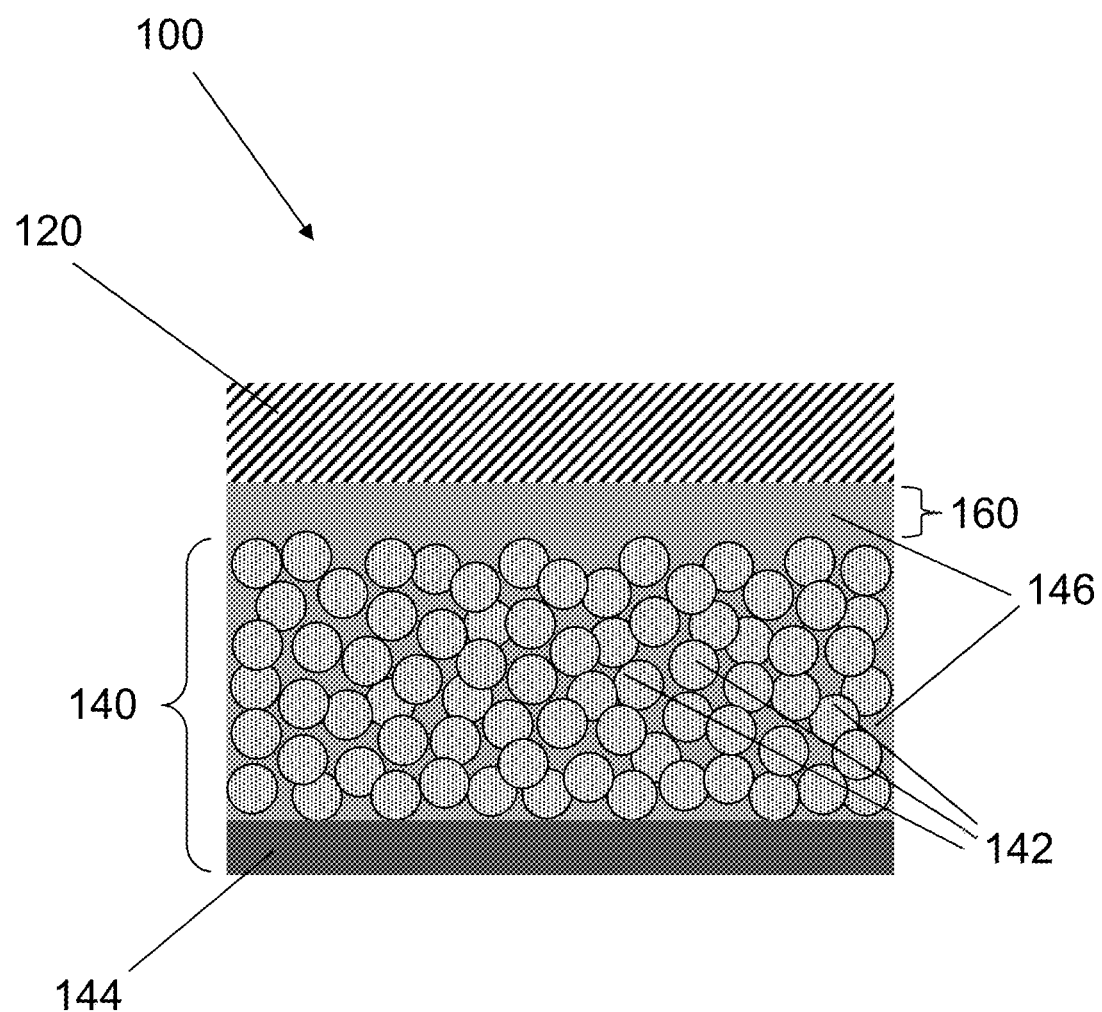
FIG. 1 is a schematic illustration of one configuration of a lithium battery cell that contains an electrolyte that is used in both the cathode and the separator, according to an embodiment of the invention.

The embodiments of the invention are illustrated in the context of sulfur-based polyesters that can be used as electrolytes or electrolyte additives in lithium battery cells and the like. The skilled artisan will readily appreciate, however, that the materials and methods disclosed herein will have application in a number of other contexts where high-voltage electrolytes are desirable, particularly where long-term stability is important.

These and other objects and advantages of the present invention will become more fully apparent from the following description taken in conjunction with the accompanying drawings.

All publications referred to herein are incorporated by reference in their entirety for all purposes as if fully set forth herein.

In this disclosure, the terms "negative electrode" and "anode" are both used to describe a negative electrode. Likewise, the terms "positive electrode" and "cathode" are both used to describe a positive electrode.

It is to be understood that the terms "lithium metal" or "lithium foil," as used herein with respect to negative electrodes, describe both pure lithium metal and lithium-rich metal alloys as are known in the art. Examples of lithium rich metal alloys suitable for use as anodes include Li—Al, Li—Si, Li—Sn, Li—Hg, Li—Zn, Li—Pb, Li—C or any other Li-metal alloy suitable for use in lithium metal batteries. Other negative electrode materials that can be used in the embodiments of the invention include materials in which lithium can intercalate, such as graphite, and other materials that can absorb and release lithium ions, such as silicon, germanium, tin, and alloys thereof. Many embodiments described herein are directed to batteries with solid polymer electrolytes, which serve the functions of both electrolyte and separator. As it is well known in the art, batteries with liquid electrolytes use an inactive separator material that is distinct from the liquid electrolyte.

The following construction is used throughout this disclosure: "each variable is chosen independently" from a list that is provided. An example of this usage can be found with reference to X groups in some of the inventive polymer structures in which there are many Xs. The example is, "each X may be chosen independently from hydrogen, fluorine, methyl, ethyl, isopropyl, and trifluoromethyl groups." This construction is used to mean that for a particular X in the structure, any of the groups in the list may be used. In choosing a group to use for another X in the structure, any of the groups in the list may be used with no regard to the choices that have been made for other X groups. Thus, the following arrangements are all possible: all the Xs may be the same, all the Xs may be different, or some Xs may be the same and some may be different.

The molecular weights given herein are number-averaged molecular weights.

The term "solid polymer electrolyte" is used herein to mean a polymer electrolyte that is solid at battery cell operating temperatures. Examples of useful battery cell operating temperatures include room temperature (25° C.), 40° C., and 80° C.

In this disclosure, ranges of values are given for many variables. It should be understood that the possible values for any variable also include any range subsumed within the given range.

Based on repeated observation of Li$^+$ interaction with other atoms in molecular dynamics (MD) simulations, it seems that Li$^+$ coordinates with partially-negatively-charged atoms in polymer electrolytes. For example, in polyethylene oxide (PEO), Li$^+$ coordinates with partially-negatively-charged oxygen atoms in the PEO. Similarly, in sulfur-based polyesters, Li$^+$ coordinates with partially-negatively charged oxygens of the carbonyl groups.

Sulfur-Based Polyesters:

In some embodiments of the invention, the general structures of sulfur-based polyesters are shown below:

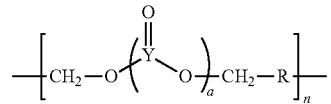

in which Y may be sulphur (S), and the structure is poly (sulfite), or Y may be sulphoxide, i.e., S=O, and the structure is poly(sulfate). Both a and n are integers. The value of a ranges from 2 to 10. The value of n ranges from 1 to 1000. R is chosen independently from the lists below.

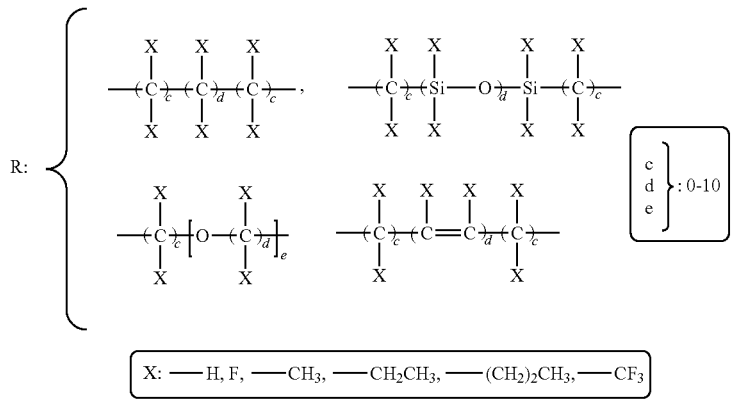

In R, c, d and e are all integers that range independently from 0 to 10; X may be hydrogen, fluorine, methyl, ethyl, isopropyl, or trifluoromethyl.

In another embodiment of the invention, particles of ceramic electrolyte are mixed into a sulfur-based polyester electrolyte to form an enhanced composite electrolyte with superior ionic transport and mechanical properties. Such a composite electrolyte may be used in a lithium battery cell in the separator region or in the cathode. Examples of ceramic electrolytes that are useful for mixing with sulfur-based polyester electrolytes include, but are not limited to, those shown in Table 1 below.

silicon. Other choices for the anode 120 include, but are not limited to, lithium titanate, and lithium-silicon alloys. The lithium battery cell 100 also has a cathode 140 that includes cathode active material particles 142, an electronically-conductive additive such as carbon black (not shown), a current collector 144, a catholyte (electrolyte in the cathode) 146, and an optional binder (not shown). In one arrangement, the catholyte 146 includes any of the sulfur-based polyester electrolytes disclosed above. In another arrangement, the catholyte 146 includes mixtures or combinations of other solid polymer electrolytes with sulfur-based polyester electrolytes. There is a separator region 160 between

TABLE 1

Exemplary Ceramic Conductors for Use as Additives in Sulfur-based Polyester Electrolytes

| Electrolyte Type | Exemplary Formulas | Mixture Proportion |
|---|---|---|
| Oxynitride glass | $Li_xPO_yN_z$ x = 2.9, y = 3.3, z = 0.46 0.24 < z < 1.2 | |
| | $Li_xBO_yN_z$ | |
| Sulfide and oxysulfide glass | $Li_2S \cdot P_2S_5$ | 0.75:0.25 |
| | $Li_2S \cdot SiS_2$ | 0.6:0.4 |
| | $Li_2S \cdot SiS_2 \cdot Li_xMO_4$ M = Si, P, Ge | 0.57:0.38:0.05 |
| | $Li_2S \cdot SiS_2 \cdot Li_3PO_4$ | 0.63:0.36:0.01 |
| | $Li_2S \cdot SiS_2 \cdot xMS_y$, M = Sn, Ta, Ti | 0.6:0.4:0.01-0.05 |
| | $Li_2S \cdot SiS_2 \cdot Li_3N$ | 0.55:0.40:0.03 |
| Li thionitride glass | $Li_3N \cdot SiS_2$ | 0.4:0.6 |
| LLTO Perovskite structure (Ohara type) | $La_{2/3-x}Li_{3x}TiO_3$ 0.03 ≤ x ≤ 0.167 | |
| | $La_{1/3-x}Li_{3x}TaO_3$ 0.025 ≤ x ≤ 0.167 | |
| | $La_{1/3-x}Li_{3x}NbO_3$ 0 ≤ x ≤ 0.06 | |
| Nasicon-type (Lisicon) phosphate | $Li_{1.3}Ti_{1.7}Al_{0.3}(PO_4)_3$ | |
| | $LiAlTa(PO_4)_3$ | |
| | $LiAl_{0.4}Ge_{1.6}(PO_4)_3$ | |
| | $Li_{1.4}Ti_{1.6}Y_{0.4}(PO_4)_3$ | |
| | $Li_{3-2x}(Sc_{1-x}M_x)_2(PO_4)_3$ M = Zr, Ti, x = 0.1, 0.2 | |
| | $Li_3Sc_{1.5}Fe_{0.5}(PO_4)_3$ | |

*denotes that components are mixed together

Table 2 below shows simulated lithium ion transport properties for various sulfur-based polyester materials. These polymers show promising lithium ion transport properties.

the anode 120 and the cathode 140. The catholyte 146 extends all the way into the separator region 160 and facilitates movement of lithium ions back and forth between the anode 120 and the cathode 140 as the cell 100 cycles.

TABLE 2

Comparison of Lithium Transport Properties for PEO, PPM and Poly(sulfate) Electrolyte Materials

| Polymer | Chemical Structure | LiTFSI Concentration (wt %) | κ (S/cm) | $t_+$ |
|---|---|---|---|---|
| PEO | R1–O–R2 | 30 | $8.2 \pm 2.2 \times 10^{-4}$ | $0.18 \pm 0.07$ |
| Poly(pentylmalonate) | R1–(CH2)5–O–C(=O)–CH2–C(=O)–O–R2 | 30 | $4.4 \times 10^{-4}$ | 0.66 |
| Poly(ethylsulphate) | R1–CH2–O–S(=O)(=O)–O–CH2–R2 | 30 | $9.2 \times 10^{-5}$ | 0.90 |

Cell Designs that Include Sulfur-Based Polyester Electrolytes

In one embodiment of the invention, a lithium battery cell 100 has an anode 120 that is configured to absorb and release lithium ions, as shown in FIG. 1. The anode 120 may be a lithium or lithium alloy foil or it may be made of a material into which lithium ions can be absorbed such as graphite or The electrolyte 146 in the separator region 160 and the catholyte 146 in the cathode 140 are the same.

Figure 2:
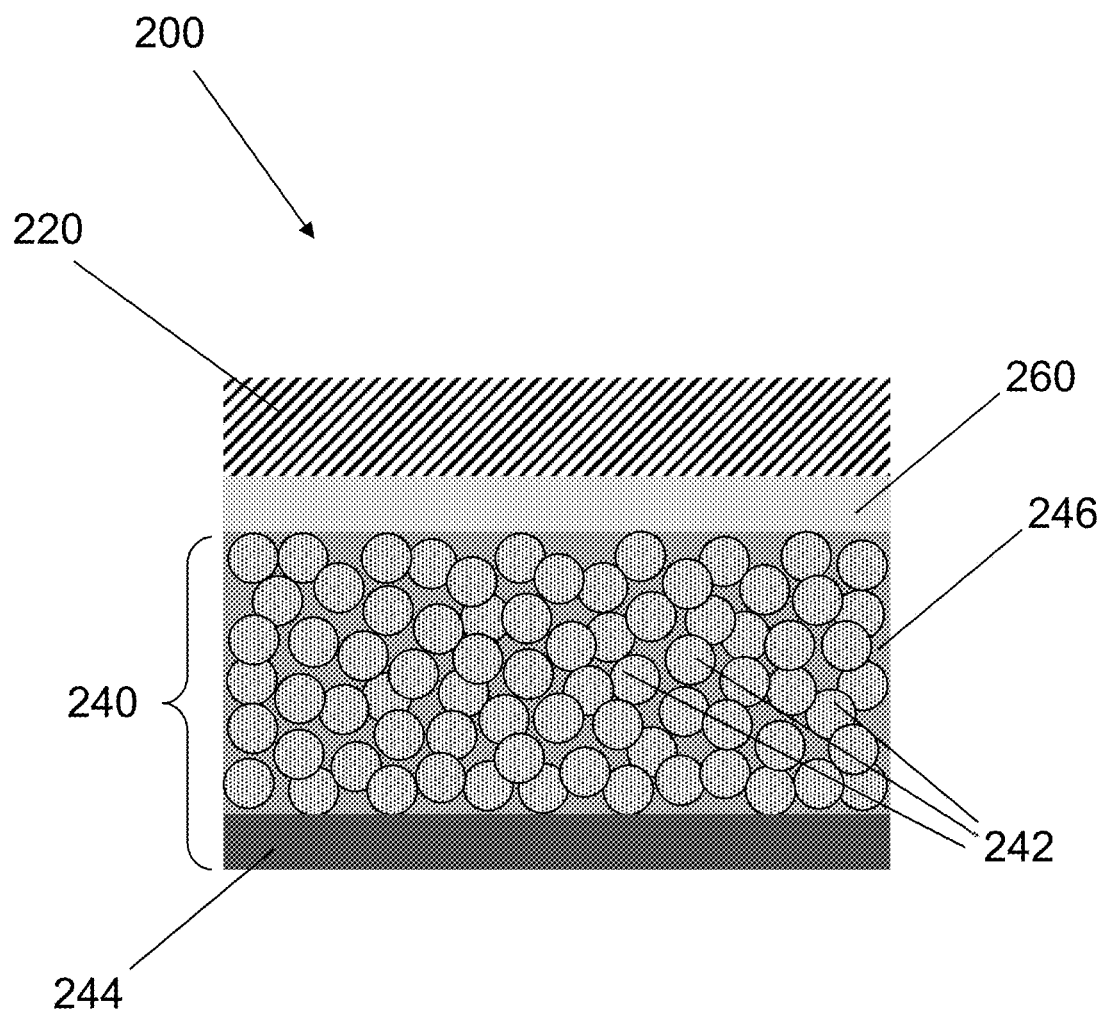
FIG. 2 is a schematic illustration of another configuration of a lithium battery cell that contains a catholyte and a separator electrolyte different from the catholyte, according to an embodiment of the invention.

In another embodiment of the invention, a lithium battery cell 200 has an anode 220 that is configured to absorb and release lithium ions as shown in FIG. 2. The anode 220 may be a lithium or lithium alloy foil or it may be made of a material into which lithium ions can be absorbed such as graphite or silicon. Other choices for the anode 220 include, but are not limited to, lithium titanate, and lithium-silicon alloys. The lithium battery cell 200 also has a cathode 240 that includes cathode active material particles 242, an electronically-conductive additive such as carbon black (not shown), a current collector 244, a catholyte 246, and an optional binder (not shown). In one arrangement, the catholyte 246 includes any of the sulfur-based polyester electrolytes disclosed above. In another arrangement, the catholyte 246 includes mixtures or combinations of other solid polymer electrolytes with sulfur-based polyester electrolytes. There is a separator electrolyte 260 between the anode 220 and the cathode 240. The separator electrolyte 260 facilitates movement of lithium ions back and forth between the anode 220 and the cathode 240 as the cell 200 cycles. The separator electrolyte 260 may include any electrolyte that is suitable for use in a lithium battery cell. In one arrangement, the separator electrolyte 260 contains a liquid electrolyte that is soaked into a porous plastic material (not shown). In another arrangement, the separator electrolyte 260 contains a viscous liquid or gel electrolyte. In another arrangement, the separator region 260 contains a solid polymer electrolyte in which the sulfur-based polyester is immiscible.

Figure 3:
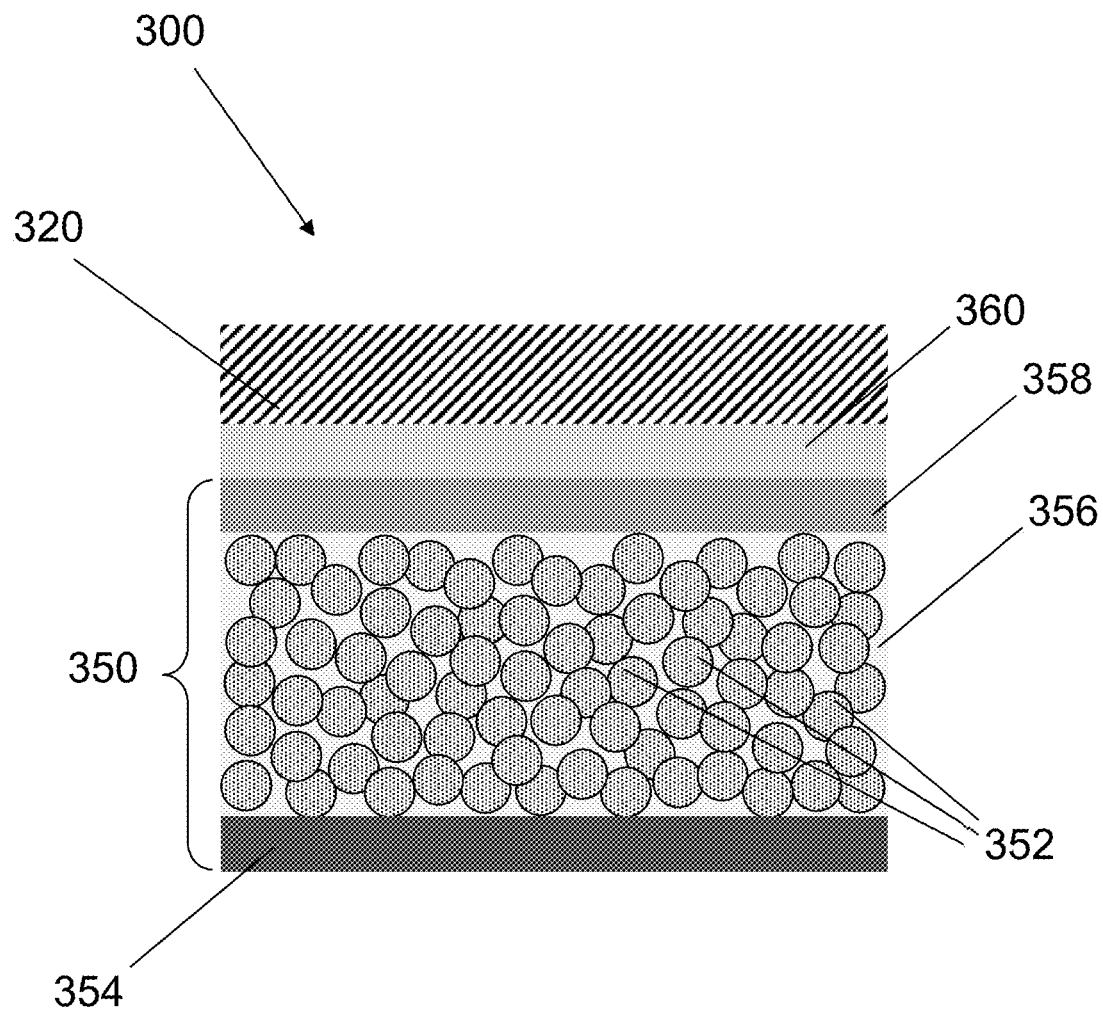
FIG. 3 is a schematic illustration of another configuration of a lithium battery cell that contains a catholyte and a cathode overcoat layer, according to an embodiment of the invention.

In another embodiment of the invention, a battery cell with a third configuration is described. With reference to FIG. 3, a lithium battery cell 300 has an anode 320 that is configured to absorb and release lithium ions. The anode 320 may be a lithium or lithium alloy foil or it may be made of a material into which lithium ions can be absorbed such as graphite or silicon. Other choices for the anode 320 include, but are not limited to, lithium titanate, and lithium-silicon alloys. The lithium battery cell 300 also has a cathode 350 that includes cathode active material particles 352, an electronically-conductive additive (not shown), a current collector 354, a catholyte 356, an optional binder (not shown), and an overcoat layer 358. In one arrangement, the electrolyte in the overcoat layer 358 and the catholyte 356 are the same. In another arrangement, the electrolyte in the overcoat layer 358 and the catholyte 356 are different. The overcoat layer 358 and/or the catholyte 356 may contain any of the sulfur-based polyester electrolytes or mixtures or combinations of other solid polymer electrolytes with sulfur-based polyester electrolytes or electrolyte additives (in a solid polymer electrolyte host) disclosed herein. In one arrangement, the overcoat layer 358 is a solid electrolyte layer. Between the anode 320 and the cathode 350 there is a separator region that contains a separator electrolyte 360 that facilitates movement of lithium ions back and forth between the anode 320 and the cathode 350 as the cell 300 cycles. The separator electrolyte 360 may include any electrolyte that is suitable for such use in a lithium battery cell. In one arrangement, the separator electrolyte 360 contains a liquid electrolyte that is soaked into a porous plastic material (not shown). In another arrangement, the separator electrolyte 360 contains a viscous liquid or gel electrolyte. In another arrangement, the separator electrolyte 360 contains a solid polymer electrolyte in which the sulfur-based polyester is immiscible.

A solid polymer electrolyte for use in separator region, such as separator regions 260 or 360, can be any electrolyte that is appropriate for use in a Li battery. Of course, many such electrolytes also include electrolyte salt(s) that help to provide ionic conductivity. Examples of useful Li salts include, but are not limited to, $LiPF_6$, $LiN(CF_3SO_2)_2$, $Li(CF_3SO_2)_3C$, $LiN(SO_2CF_2CF_3)_2$, $LiB(C_2O_4)_2$, $Li_2B_{12}F_xH_{12-x}$, $Li_2B_{12}F_{12}$, $LiN(FSO_2)_2$, $LiN(CN)_2$, $LiB(CN)_4$ and mixtures thereof. Examples of such electrolytes include, but are not limited to, block copolymers that contain ionically-conductive blocks and structural blocks that make up ionically-conductive phases and structural phases, respectively. The ionically-conductive phase may contain one or more linear polymers such as polyethers, polyamines, polyimides, polyamides, poly alkyl carbonates, polynitriles, perfluoro polyethers, fluorocarbon polymers substituted with high dielectric constant groups such as nitriles, carbonates, and sulfones, and combinations thereof. In one arrangement, the ionically-conductive phase contains one or more sulfur-based polyester electrolytes, as disclosed herein. The linear polymers can also be used in combination as graft copolymers with polysiloxanes, polyalkoxysiloxanes, polyphosphazines, polyolefins, and/or polydienes to form the conductive phase. The structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide), poly(phenylene sulfide), poly(phenylene sulfide sulfone), poly(phenylene sulfide ketone), poly(phenylene sulfide amide), polysulfone, fluorocarbons, such as polyvinylidene fluoride, or copolymers that contain styrene, methacrylate, or vinylpyridine. It is especially useful if the structural phase is rigid and is in a glassy or crystalline state.

With respect to the embodiments described in FIGS. 1, 2, and 3, suitable cathode active materials include, but are not limited to, LFP (lithium iron phosphate), LMP (lithium metal phosphate in which the metal can be Mn, Co, or Ni), $V_2O_5$ (divanadium pentoxide), NCA (lithium nickel cobalt aluminum oxide), NCM (lithium nickel cobalt manganese oxide), high energy NCM (HE-NCM magnesium-rich lithium nickel cobalt manganese oxide), lithium manganese oxide spinel, lithium nickel manganese oxide spinel, and combinations thereof. Suitable electronically-conductive additives include, but are not limited to, carbon black, graphite, vapor-grown carbon fiber, graphene, carbon nanotubes, and combinations thereof. A binder can be used to hold together the cathode active material particles and the electronically conductive additive. Suitable binders include, but are not limited to, PVDF (polyvinylidene difluoride), PVDF-HFP poly (vinylidene fluoride-co-hexafluoropropylene), PAN (polyacrylonitrile), PAA (polyacrylic acid), PEO (polyethylene oxide), CMC (carboxymethyl cellulose), and SBR (styrene-butadiene rubber).

Any of the polymers described herein may be liquid or solid, depending on its molecular weight. Any of the polymers described herein may be in a crosslinked or an uncrosslinked state. Any of the polymers described herein may be crystalline or glassy. Any of the polymers described herein may be copolymerized with other polymers to form copolymers, block copolymers, or graft copolymers. Copolymerization may also affect the mechanical properties of some polymers allowing them to become solid polymer electrolytes. Any of the polymers described herein can be combined with an electrolyte salt to be used as a solid polymer electrolyte. Any of these solid polymer electrolytes may be used as separator, catholyte, anolyte, or any combination thereof in a battery cell.

EXAMPLES

The following example provides details relating to synthesis of sulfur-based polyesters, poly butyl(disulfites) in accordance with the present invention. It should be understood the following is representative only, and that the invention is not limited by the detail set forth in this example.

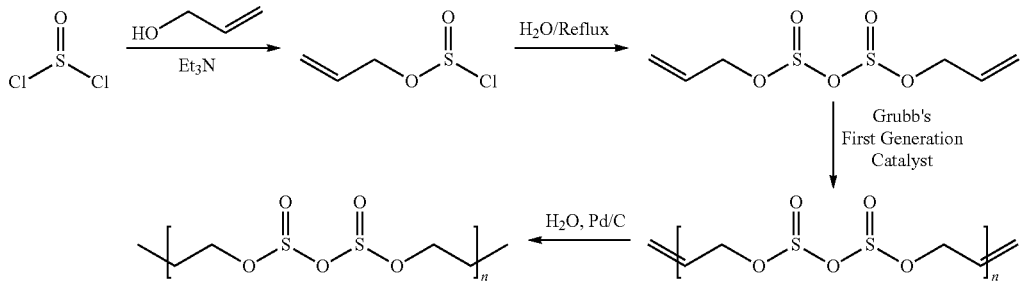

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:
1. A polymer, comprising:
a polymer structure described by:

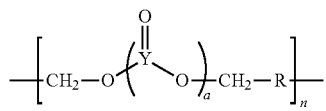

wherein:
Y is selected from the group consisting of sulphur and sulphoxide;
a and n are integers, wherein a ranges from 2 to 10, and n ranges from 1 to 1000;
R is selected from the group consisting of:

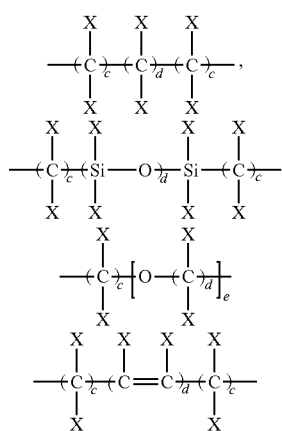

wherein c, d and e are all integers that range independently from 0 to 10; and

X is selected from the group consisting of hydrogen, fluorine, methyl, ethyl, isopropyl, and trifluoromethyl.
2. A polymer electrolyte comprising the polymer of claim 1 and an electrolyte salt.
3. The polymer electrolyte of claim 2, further comprising ceramic electrolyte particles.
4. A positive electrode comprising:
a positive electrode active material; and
a catholyte comprising the polymer electrolyte according to claim 2;
wherein the positive electrode active material particles and the catholyte are mixed together.
5. The positive electrode of claim 4 wherein the catholyte further comprises a solid polymer electrolyte.
6. The positive electrode of claim 4 wherein the catholyte further comprises ceramic electrolyte particles.
7. The positive electrode of claim 4 wherein the catholyte is crosslinked.
8. The positive electrode of claim 4 wherein the positive electrode active material is selected from the group consisting of lithium metal phosphate, divanadium pentoxide, lithium nickel cobalt aluminum oxide, lithium nickel cobalt manganese oxide, magnesium-rich lithium nickel cobalt manganese oxide, lithium manganese oxide spinel, lithium nickel manganese oxide spinel, and combinations thereof.
9. The positive electrode of claim 4 wherein the electrolyte salt is a lithium salt.
10. An electrochemical cell, comprising:
an anode configured to absorb and release lithium ions;
a cathode comprising cathode active material particles, an electronically-conductive additive, and a first catholyte;
a current collector adjacent to an outside surface of the cathode; and
a separator region between the anode and the cathode, the separator region comprising a separator electrolyte configured to facilitate movement of lithium ions back and forth between the anode and the cathode;
wherein the first catholyte comprises the polymer electrolyte according to claim 2, and the electrolyte salt is a lithium salt.
11. The electrochemical cell of claim 10 wherein the first catholyte further comprises a solid polymer electrolyte.
12. The electrochemical cell of claim 10 wherein the first catholyte and the separator electrolyte are the same.
13. The electrochemical cell of claim 10 wherein the separator electrolyte comprises a solid polymer electrolyte.
14. The electrochemical cell of claim 10 further comprising an overcoat layer between the cathode and the separator region, the overcoat layer comprising a second catholyte, the second catholyte comprising the polymer electrolyte according to claim 2.

15. The electrochemical cell of claim 14 wherein the first catholyte and the second catholyte are the same.

16. The electrochemical cell of claim 10 wherein the first catholyte further comprises ceramic electrolyte particles.

17. The electrochemical cell of claim 10 wherein the first catholyte is crosslinked.

18. The polymer of claim 1 wherein the polymer is crosslinked.

19. A polymer electrolyte comprising the polymer of claim 18 and an electrolyte salt.

20. A polymer, comprising:
a polymer structure described by:

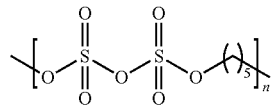

wherein n is an integer that ranges from 1 to 1000.

\* \* \* \* \*